73. MEASURING AND TESTING.

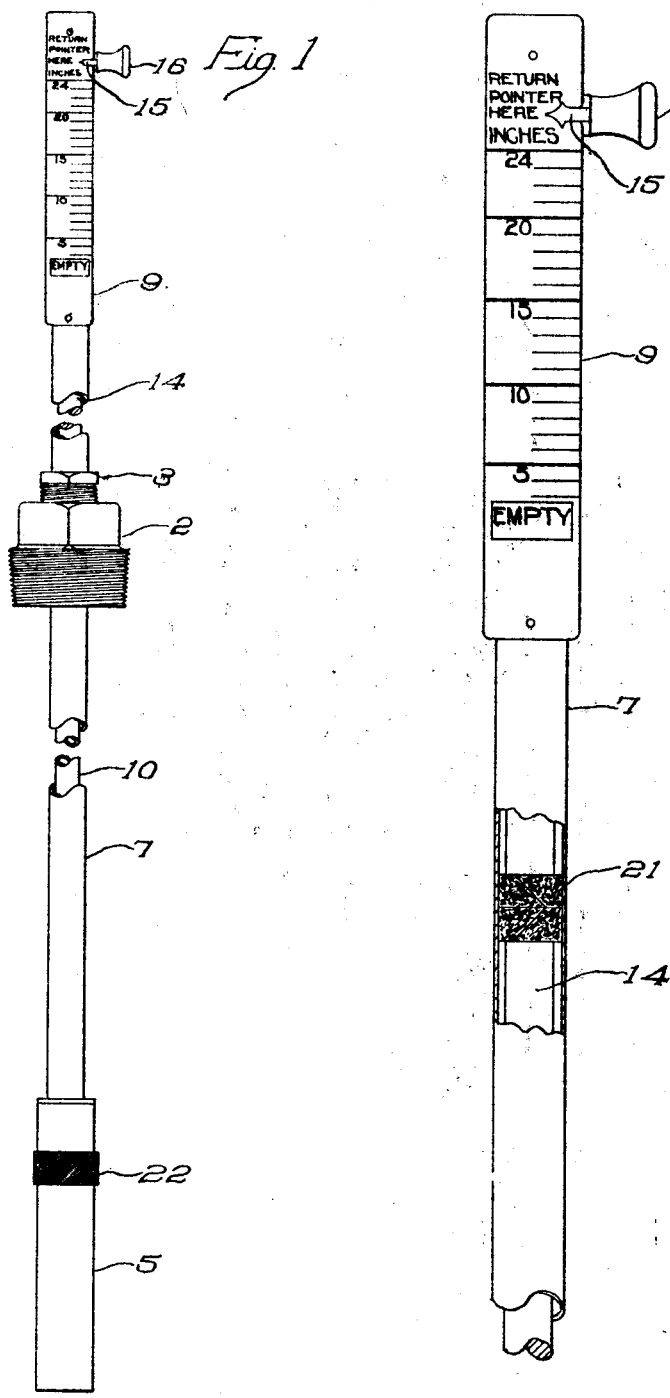

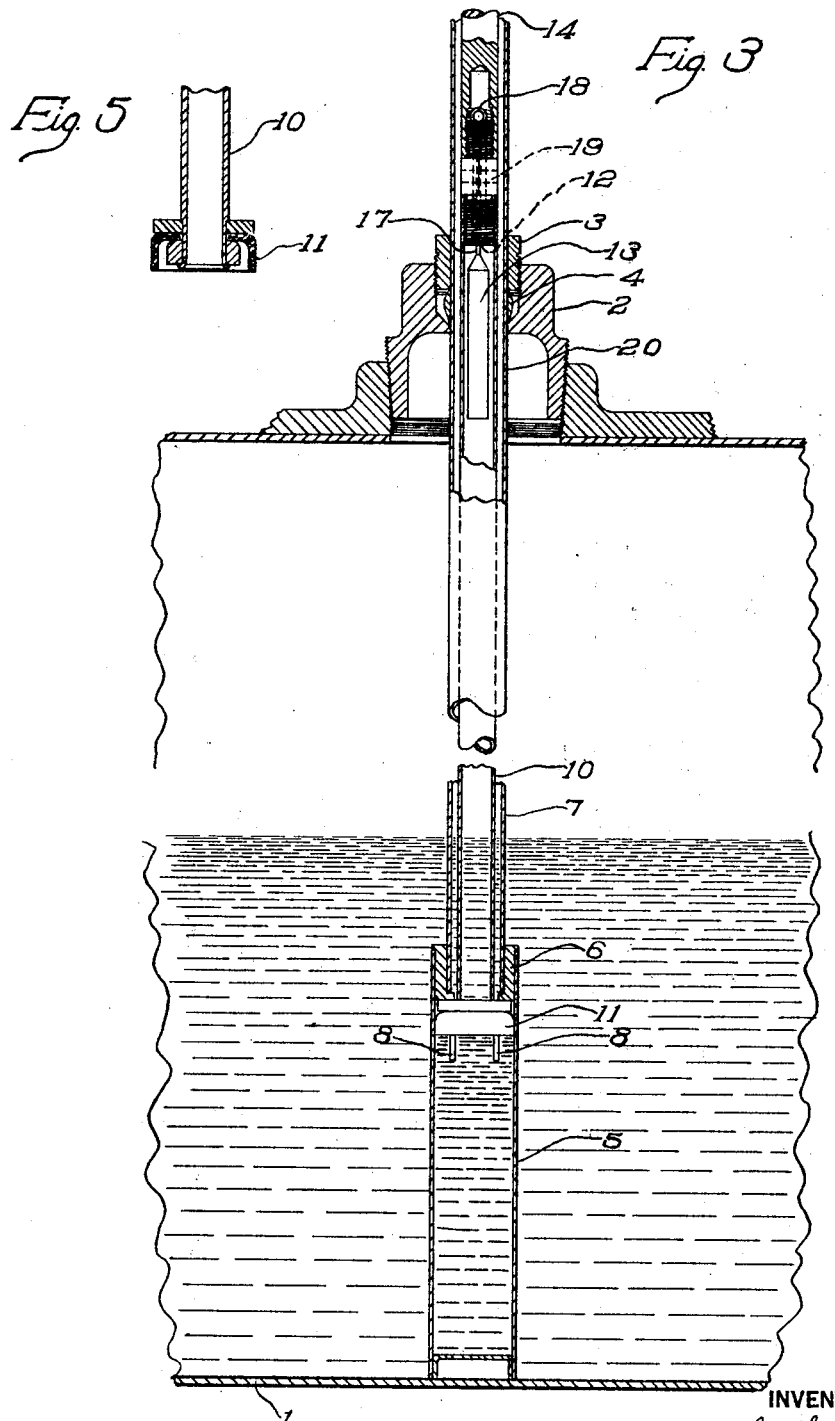

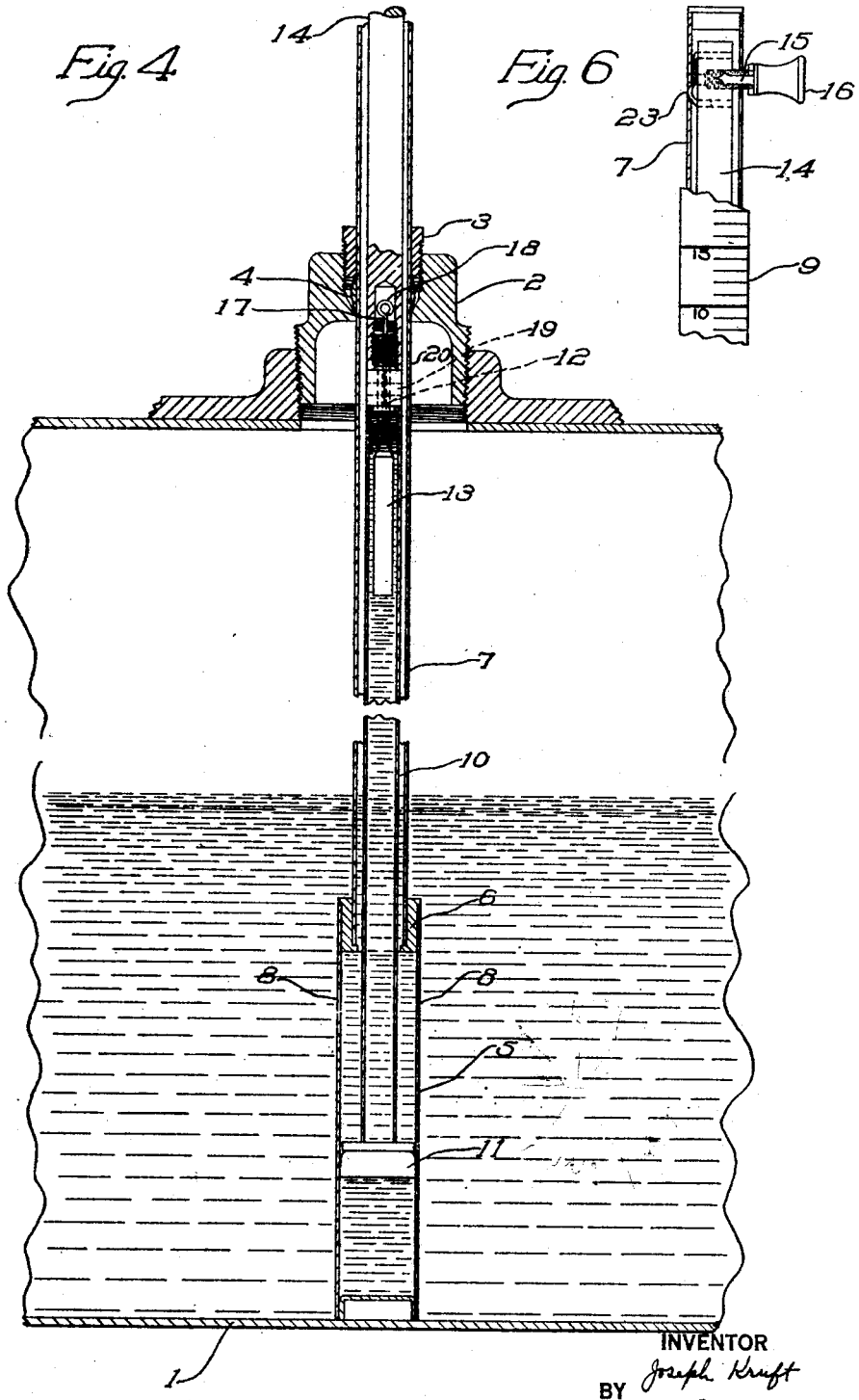

Patented Nov. 3, 1931

1,830,116

UNITED STATES PATENT OFFICE

JOSEPH KRUFT, OF ROCKAWAY, NEW JERSEY, ASSIGNOR TO AMERICAN GAUGE CORPORATION, A CORPORATION OF NEW JERSEY

LIQUID LEVEL GAUGE

Application filed December 9, 1927. Serial No. 238,949.

My invention relates to gauges for measuring the amount of liquid in a container and, particularly, to that type of gauge in which a column of liquid of equal level with the liquid in the container is trapped in a chamber and the size or capacity of the chamber is reduced to the volume of trapped liquid.

Among other objects, the invention is intended to provide certain improvements contributing to the efficiency and dependability of gauges of the type referred to and, particularly, to provide improvements in the trapping chamber and the means for trapping the liquid therein and for reducing the size or capacity of the chamber to the volume of the trapped liquid.

The gauge selected for illustration is a gauge for measuring the amount of fuel oil in a storage tank having a depth of twenty-four inches, but the inventive subjects matter may be employed to advantage in gauges of other sizes and for other purposes.

In the drawings,

Fig. 1 is a perspective view of the illustrative gauge broken away at two points for clearness of illustration.

Fig. 2 is an enlarged front elevation, partly in section, of the upper part of the gauge and showing the indicator.

Fig. 3 is a view, in vertical section, of the gauge located in a tank containing oil and showing the parts of the gauge in non-measuring position. This Fig. 3 is on a larger scale than Fig. 1 but on a smaller scale than Fig. 2.

Fig. 4 is a similar view showing the parts of the gauge in measuring position.

Fig. 5 is a view, in vertical section, of the operating piston and the lower end of the piston rod. This Fig. 5 is on the same scale as Fig. 2.

Fig. 6 is a view, in vertical section, of the upper end of the gauge with the indicator plate broken away to show the spring catch for holding the parts in non-measuring position.

The illustrative gauge rests on the bottom 1 of the tank and extends upward through a tank plug 2 to which the gauge is firmly secured by a compression nut 3 and a compression sleeve 4.

The lower end of the gauge consists of a cylinder 5 closed at its lower extremity and provided at its upper extremity with a plug 6 having a central opening to receive and support a tube 7. Slots or openings 8 are provided in the wall of cylinder 5 a short distance below plug 6 to permit the oil in the tank to enter cylinder 5. A screen covering 22 for slots 8 may be provided to prevent dirt and sediment from entering cylinder 5. Tube 7 extends upward through tank plug 2 and, at its upper extremity, carries an indicator plate 9. Slidably mounted in tube 7 is a hollow piston rod 10 carrying at its lower extremity a piston 11 which is reciprocable in cylinder 5, the piston 11 being firmly secured to the piston rod 10. Piston rod 10 is open at its lower extremity and passes through piston 11. Thus, piston rod 10 and cylinder 5 communicate one with the other, and the oil in the tank which enters cylinder 5 through slots 8 is free to rise in piston rod 10 to the same level as in the tank. Piston rod 10 is provided near its upper extremity with an air vent 12 and a valve 13 operable in the manner hereinafter described to permit the passage of air into and out of piston rod 10 and to prevent the passage of oil out of piston rod 10. A solid rod 14 is secured to the upper end of piston rod 10, which rod 14 extends upward in tube 7 to within a short distance of the top of tube 7. An indicator finger 15 and an operating handle 16 are secured to the top of rod 14, a slot in tube 7 being provided to permit finger 15 and handle 16 to travel down and up in the manner hereinafter described. Finger 15 extends over onto the face of indicator plate 9, as shown in Figs. 1 and 2. A spring catch 23, as shown in Fig. 6, yieldingly holds rod 14 in its uppermost position.

The capacity of that portion of cylinder 5 which extends below slots 8 is substantially equal to the capacity of that portion of hollow piston rod 10 which extends below valve 13, so that when the oil in cylinder 5 is level with the slots 8 and all of the oil in cylinder 5 is forced into piston rod 10, the oil will fill piston rod 10 and cause valve 13 to close air vent 12 in the manner hereinafter described. When the oil level is above slots 8 and partially filling piston rod 10, a lesser amount of the oil in cylinder 5 will be required to fill piston rod 10 and close air vent 12.

The diameter of cylinder 5 is greater than the diameter of piston rod 10, so that when oil is forced from cylinder 5 into piston rod 10, the displacement of a lineal inch of oil in cylinder 5 will fill several lineal inches of space in piston rod 10. The respective diameters of cylinder 5 and piston rod 10 may be varied to suit different conditions. In the illustrative gauge, the respective diameters are such that a lineal inch of oil in cylinder 5 will fill 7.76 lineal inches of space in piston rod 10.

The oil in cylinder 5 is forced into piston rod 10 by moving piston rod 10 and its piston 11 downward past slots 8 in cylinder 5. When piston 11 passes slots 8, it cuts off communication between the oil in cylinder 5 and the oil in the tank, and further movement downward of piston 11 forces the trapped oil up into piston rod 10 until the rising oil in piston rod 10 strikes valve 13 and raises it into its seat in air vent 12, thereby closing air vent 12 against the passage of oil and, because liquids are not compressible, preventing further downward movement of piston 11.

Valve 13 is preferably in the form of a thin metal cylinder open at the bottom and closed at the top, the top being tapered and rounded to seat firmly in air vent 12. Valve 13 is suspended below air vent 12 by a stem 17, the upper end of which is bent in the form of a ring 18. The rising oil forces valves 13 upward to close air vent 12.

Openings 19 permit the air to pass from air vent 12 into tube 7. Openings 20 in tube 7 permit the air to pass from tube 7 into the tank and thence to the outside of the tank, through the usual vent pipe provided in such tanks. The negligible amount of oil which might pass through air vent 12 during the raising of valve 13 passes through openings 19 and drops back into the tank either through openings 20 or through the slots 8 in cylinder 5. To prevent any possible escape of oil or gases from the gauge above the tank, a packing 21 is provided between rod 14 and tube 7, as best shown in Fig. 2.

As explained hereinbefore, a movement of piston 11 downward one inch below slots 8 forces oil to rise 7.76 inches in piston rod 10. The extent of downward movement of piston 11 is governed by the level of the oil in piston rod 10 at the time the movement is started, which level is the same as the level of the oil in the tank. For example, if the oil is level with slots 8, a full stroke of piston 11 will be required to fill piston rod 10 and close air vent 12. If the level of the oil is above slots 8, a lesser stroke of piston 11 will be required to fill piston rod 10 and close the air vent 12. Thus, it will be seen that a higher level of oil in the tank requires a shorter stroke of piston 11 to take a measurement, and vice versa. As handle 16 and pointer 15 move with piston 11, the extent of movement of pointer 15 indicates the extent of movement of piston 11 required to fill piston rod 10 with oil and thereby indicates the lineal inches of travel of the oil in piston rod 10, and this lineal inches of travel substracted from the depth of the tank represents the lineal inches of oil in the tank, which latter result is shown by appropriate markings on indicator plate 9.

The operation of the gauge is as follows: In Fig. 3 the parts are shown in normal, non-measuring position. In this position, piston 11 is above slots 8, and indicator finger 15 is above the line 24 on indicator plate 9 a distance substantially equal to the height of slots 8. The oil has entered slots 8 and risen in piston rod 10 to equal level with the oil in the tank. To take a measurement, handle 16 is moved downward until it stops. Movement of handle 16 carries with it indicator finger 15, piston rod 10 and piston 11. When the lower extremity of piston 11 reaches the lower extremities of slots 8, it has trapped in cylinder 5 and piston rod 10 a column of oil of equal level with the oil in the tank. This movement lowers indicator finger 15 to the line 24 on indicator plate 9. If the tank is full of oil, the pressure of piston 11 on the oil in piston rod 10 will raise valve 13 and close air vent 12 against the passage of oil and thereby prevent piston 11 from being lowered below this point, and indicator finger 15 will show twenty-four lineal inches of oil in the tank. If the tank is not full, as shown in Figs. 3 and 4, continued downward movement of piston 11 below slots 8 will force oil from cylinder 5 up into piston rod 10 until the rising oil strikes valve 13 and raises it into its valve seat in air vent 12, thereby closing air vent 12 against the passage of oil. Liquids being non-compressible, piston 11 cannot be lowered further and handle 16 and indicator 15 stop. The distance moved by piston 11 and indicator 15 multiplied by 7.76 equals the lineal outage of the tank. Subtracting this lineal outage from the total depth of the tank gives the lineal height of oil in the tank and this result is indicated on indicator plate 9 at the point where the indicator finger 15 stops. After a reading is taken, handle 16 is raised to initial position, thereby returning indicator finger 15 and piston 11 to their initial positions.

Because the capacity of cylinder 5 is substantially the same as the capacity of hollow piston rod 10, and because piston rod 10 must be filled with oil each time a measurement is taken, the gauge will not measure the oil in the tank if the oil level is below the lower extremities of slots 8. As the presence of sediment in a fuel oil tank makes it inadvisable to use the last few inches of oil in the tank, cylinder 5 and piston rod 10 are designed to indicate that the tank is empty when only a few inches of oil remain in the tank. In the illustrative gauge, the height of piston rod 10 is substantially 7.76 times the height of cylinder 5, and slots 8 are located substantially three inches above the bottom of the twenty-four inch tank, so that when the tank contains less than three inches of oil, the indicator finger 15 will stop within the space marked "Empty" on the indicator plate 9. As will appear to those skilled in the art, a lower level of oil may be measured by increasing the difference between the respective diameters of cylinder 5 and piston rod 10 and thereby reducing the height of cylinder 5 and lowering slots 8.

The expression "effective capacity" as used in the specification and claims is intended to cover the capacity of the relatively movable compartments 5 and 10 to hold liquid trapped therein.

Among other advantages, the gauge is direct and positive in its operation, has few parts and requires a minimum of effort to operate. The hollow piston rod 10 functions both as a piston rod and as a trapping chamber, thereby eliminating the necessity of using two elements to perform these functions. The relative diameters of the hollow piston rod 10 and the cylinder 5 may be varied for different sized tanks to reduce to a minimum the extent of movement of the operating handle required to take a measurement.

Having described one illustrative embodiment of my invention, I claim:

1. A gauge for measuring the amount of liquid in a container, comprising a chamber of lesser height than the container and having openings near its top communicating with the container, a piston reciprocable in said chamber and adapted when moved from its uppermost position to cut off communication between said chamber and the container, a hollow piston rod carrying said piston and communicating with said chamber, said piston rod being of sufficient height to permit the liquid to assume the same level in the piston rod and in the container and having a capacity substantially equal to the capacity of said chamber and means to permit the escape of air and prevent the escape of liquid through the upper extremity of said piston rod, whereby movement of said piston from its uppermost position in said chamber will trap a column of liquid of equal level with the liquid in the container, force the liquid out of said chamber into the piston rod and fill the piston rod with trapped liquid.

2. A gauge for measuring the amount of liquid in a container, comprising a chamber of lesser height than the container and having openings near its top communicating with the container, a piston reciprocable in said chamber and adapted when moved from its uppermost position to cut off communication between said chamber and the container, a hollow piston rod carrying said piston and communicating with said chamber, said piston rod being of sufficient height to permit the liquid to assume the same level in the piston rod and in the container and having a capacity substantially equal to the capacity of said chamber, means to permit the escape of air and prevent the escape of liquid through the upper extremity of said piston rod, whereby movement of said piston from its uppermost position in said chamber will trap a column of liquid of equal level with the liquid in the container, force the liquid out of said chamber into the piston rod and fill the piston rod with trapped liquid, and means governed by the amount of liquid required to fill the piston rod to indicate the amount of liquid in the container.

3. A gauge for measuring the amount of liquid in a container, comprising a chamber of lesser height than the container and having openings near its top communicating with the container, a piston reciprocable in said chamber and adapted when moved from its uppermost position to cut off communication between said chamber and the container, a hollow piston rod carrying said piston and communicating with said chamber, said piston rod being of sufficient height to permit the liquid to assume the same level in the piston rod and in the container and having a capacity substantially equal to the capacity of said chamber, means to permit the escape of air and prevent the escape of liquid through the upper extremity of said piston rod, whereby movement of said piston from its uppermost position in said chamber will trap a column of liquid of equal level with the liquid in the container, force the liquid out of said chamber into the piston rod and fill the piston rod with trapped liquid, and means governed by the extent of movement of said piston to indicate the amount of liquid in the container.

4. A gauge for measuring the amount of liquid in a container, comprising a chamber communicating with the container, a piston operable in said chamber to cut off communication between the chamber and the container and to force liquid out of said chamber, a hollow piston rod communicating with said chamber to receive the liquid forced from said chamber, said piston rod having substantially the same capacity as said chamber but being substantially greater in height and arranged to permit the liquid to assume the same level in the piston rod and in the container, and means to permit the escape of air from said piston rod while it is receiving liquid from said chamber and to prevent the escape of liquid from said piston rod when it is filled with liquid.

5. A gauge for measuring the amount of liquid in a container, comprising a chamber communicating with the container, a piston operable in said chamber to cut off communication between the chamber and the container and to force liquid out of said chamber, a hollow piston rod communicating with said chamber to receive the liquid forced from said chamber, said piston rod having substantially the same capacity as said chamber but being substantially greater in height and arranged to permit the liquid to assume the same level in the piston rod and in the container, means to permit the escape of air from said piston rod while it is receiving liquid from said chamber and to prevent the escape of liquid from said piston rod when it is filled with liquid, and means governed by the amount of liquid required to fill the piston rod to indicate the amount of liquid in the container.

6. A gauge for measuring the amount of liquid in a container, comprising a plurality of relatively movable communicating chambers having communication with said container, said chambers having substantially the same capacity but being substantially different in height and arranged to permit the liquid to assume the same level in said communicating chambers and in the container, and means carried by the chamber of greater height for trapping in said chambers a column of liquid of equal level with the liquid in the container and for reducing the effective capacity of said chambers to the volume of the trapped liquid by reducing the effective capacity of the chamber of lesser height.

7. A gauge for measuring the amount of liquid in a container, comprising a plurality of relatively movable communicating chambers having communication with said container, said chambers having substantially the same capacity but being substantially different in height and arranged to permit the liquid to assume the same level in said communicating chambers and in the container, means carried by the chamber of greater height for trapping in said chambers a column of liquid of equal level with the liquid in the container and for reducing the effective capacity of said chambers to the volume of the trapped liquid by reducing the effective capacity of the chamber of lesser height, and means to indicate the extent of said reduction.

8. A gauge for measuring the amount of liquid in a container, comprising a pair of relatively movable communicating chambers having communication with said container, said chambers having substantially the same capacity but being substantially different in height and arranged to permit the liquid to assume the same level in said communicating chambers and in the container, a piston carried by the chamber of greater height and operable in the chamber of lesser height for trapping in said chambers a column of liquid of equal level with the liquid in the container and for reducing the effective capacity of said chambers to the volume of the trapped liquid by reducing the effective capacity of the chamber of lesser height.

9. A gauge for measuring the amount of liquid in a container, comprising a pair of relatively movable communicating chambers having communication with said container, said chambers being substantially of the same capacity but of different heights and arranged to permit the liquid to assume the same level in said communicating chambers and in the container, and means carried by the chamber of greater height and operable in the chamber of lesser height for trapping in said chambers a column of liquid of equal level with the liquid in the container and for filling the chamber of greater height with trapped liquid.

10. A gauge for measuring the amount of liquid in a container, comprising a pair of relatively movable communicating chambers having communication with said container, said chambers being substantially of the same capacity but of different heights and arranged to permit the liquid to assume the same level in said communicating chambers and in the container, means carried by the chamber of greater height and operable in the chamber of lesser height for trapping in said chambers a column of liquid of equal level with the liquid in the container and for filling the chamber of greater height with trapped liquid, and means governed by the amount of trapped liquid required to fill the chamber of greater height to indicate the amount of liquid in the container.

In witness whereof, I have signed my name to this specification.

JOSEPH KRUFT.